Dec. 3, 1963   F. K. H. NALLINGER   3,112,810
NOISE-DEADENING MOTOR VEHICLE CONSTRUCTION
Filed March 1, 1960   2 Sheets-Sheet 1
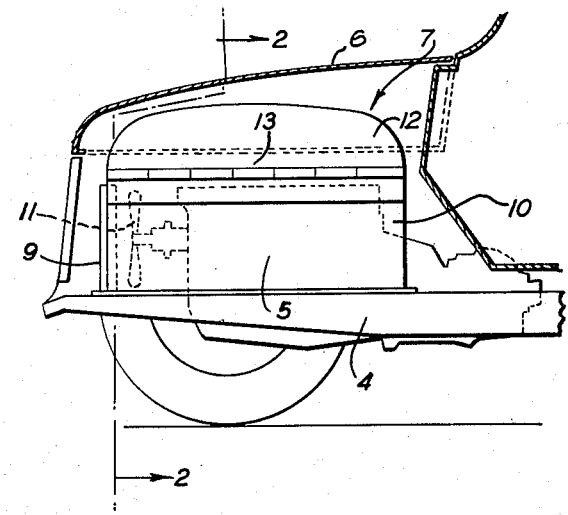
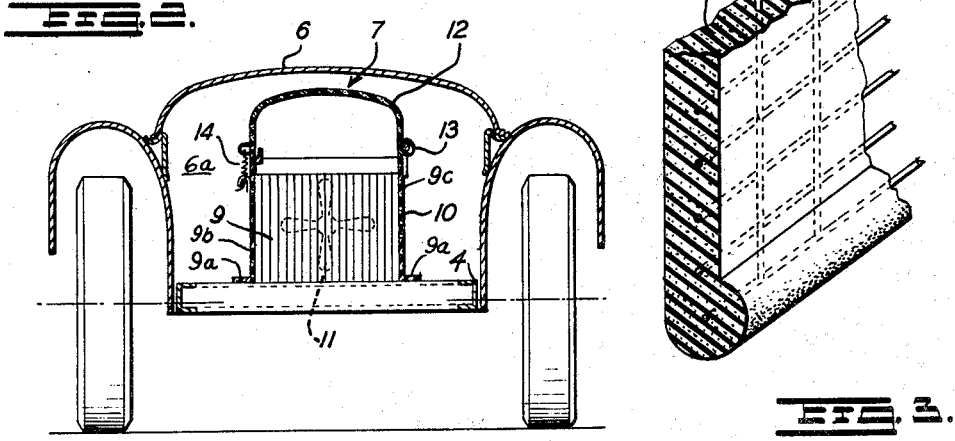
INVENTOR
FRIEDRICH K. H. NALLINGER
ATTORNEYS Dec. 3, 1963  F. K. H. NALLINGER  3,112,810
NOISE-DEADENING MOTOR VEHICLE CONSTRUCTION
Filed March 1, 1960  2 Sheets-Sheet 2
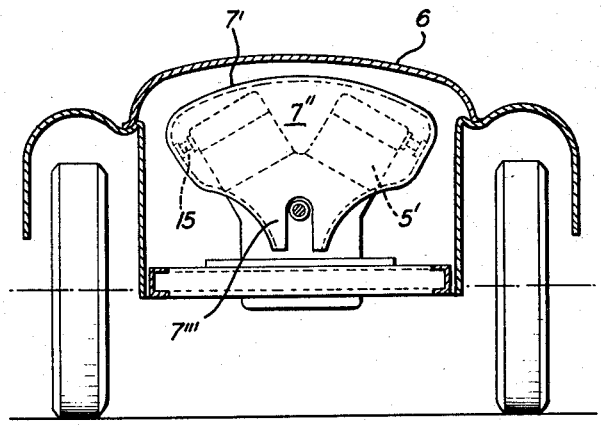
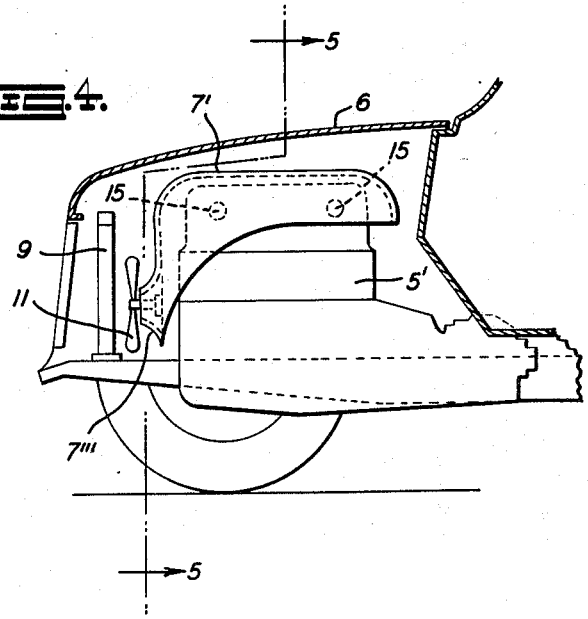
INVENTOR
FRIEDRICH K. H. NALLINGER
BY
ATTORNEYS

United States Patent Office 3,112,810
Patented Dec. 3, 1963

3,112,810
NOISE-DEADENING MOTOR VEHICLE
CONSTRUCTION
Friedrich K. H. Nallinger, Stuttgart, Germany, assignor to Daimler-Benz Aktiengesellschaft, Stuttgart-Unterturkheim, Germany
Filed Mar. 1, 1960, Ser. No. 12,115
3 Claims. (Cl. 181—33)

The present invention relates to an installation for damping noises in engines for motor vehicles, especially passenger motor vehicles, in which the engine compartment is closed off against the outside thereof by means of the movable hood or lid which forms a part of the vehicle body.

By reason of the relative large-surfaced construction and three dimensional configuration thereof, the so-called engine hoods made of relatively thin-walled sheet-metal represent an extremely likely source of noises which permits radiation of the sound vibrations produced by the engine in an almost completely undamped manner into the surroundings thereof and transmits these vibrations to the remaining areas of the vehicle body. In order to obviate these deficiencies, it has already been proposed to cover the inner surface of the hood with sound-absorbing material. However, this measure also was found not to be suitable to reduce the noise formation to such an extent as suffices the high requirements, made in particular in passenger motor vehicles. The reason therefor lies essentially in the fact that many devices, apparatus and mechanisms within the engine compartment represent structures capable of vibrations which are influenced or affected by the engine acting as the principal source of vibrations.

In order to achieve an unobjectionable and completely satisfactory noise-damping, it is proposed in accordance with the present invention to provide an installation characterized by an additional, separate cover of sound-absorbing material surrounding the engine at least partly. Additionally, according to the present invention, a free space is to remain between the surface of the cover and the wall parts of the engine space.

Accordingly, it is an object of the present invention to provide an installation which reduces effectively vibrations and noises in the engine compartment to a level satisfactory in passenger motor vehicles.

Another object of the present invention is the provision of a sound-damping arrangement which is relatively simple and yet completely satisfactory to reduce to an acceptable level the noises produced in the engine compartment which otherwise would be radiated and transmitted to the other vehicle areas by the relatively large-surface construction of the engine compartment hood.

Another object of the present invention resides in the provision of a noise-absorbing arrangement counteracting the noise-transmitting and droning characteristics inherently present with engine hoods closing off the engine space which offer a relatively large surface and are normally made of relatively thin sheet-metal construction.

These and other objects, features and advantages of the present invention will become more obvious from the following description when taken in connection with the accompanying drawing which shows, for purposes of illustration only, two embodiments in accordance with the present invention and wherein FIGURE 1 is a side elevational view partly in longitudinal cross-section of the front part of a motor vehicle in accordance with the present invention, FIGURE 2 is a cross-sectional view taken along line 2—2 of FIGURE 1, FIGURE 3 is a partial perspective view, on an enlarged scale, of a part of the walls of a slightly modified sound-deadening hood in accordance with the present invention, FIGURE 4 is a side elevational view partly in longitudinal cross-section of a second embodiment of a front part of a motor vehicle in accordance with the present invention, and FIGURE 5 is a cross-sectional view taken along line 5—5 of FIGURE 4.

Referring now to the drawing, wherein like reference numerals are used throughout the various views to designate corresponding parts, and more particularly to FIGURES 1 and 2, reference numeral 4 designates therein the vehicle frame which may be of any suitable construction and is formed by frame parts of the main frame, by an auxiliary frame or forms part of a self-supporting type body construction. The driving engine 5 of the motor vehicle, which is supported or suspended at the vehicle frame 4 in any suitable known manner, is disposed, in the usual manner, below the engine hood 6, made of sheet-metal, which is adapted to be pivoted so as to open up and render accessible the engine compartment 6a. According to the present invention, a second hood generally designated by reference numeral 7 and made of any suitable, known sound-damping material, for example, of synthetic foam rubber, is arranged between the engine 5 and the outer sheet metal hood 6. For purposes of reinforcing the walls of the auxiliary hood 7, a wire-mesh network 8 is embedded in the sound-damping material and the walls may have an enlarged lower edge, as shown in the modified construction of FIGURE 3. The hood 7 is hinged at the height of the upper edge of radiator 9. The lower part 10 of the hood has an outwardly extending flange around the edge thereof, the flange being secured at 9a by any suitable fastening means on the vehicle frame 4 and surrounds the engine 5 laterally and to the rear thereof, whereas the lateral walls thereof closely adjoin in front thereof the radiator 9 as shown at 9b and 9c respectively. The lower part 10 of auxiliary hood 7 is open toward the bottom thereof so that the cooling air supplied by the fan 11 may flow off in a downward direction and the exhaust manifolds and actuating linkages may be led out of the engine compartment through the bottom thereof. The upper part 12 of the hood 7 is operatively connected with the lower part 10 thereof by means of a suitable hinge, for example, a piano-type hinge 13, and is retained in the closed position thereof by rapid closure means 14, also of any suitable construction. Pivotable joint means 13 are provided between parts 10 and 12 at the side of auxiliary hood 7 opposite closure means 14.

During service, maintenance and/or repair operations, it is only necessary to pivot the upper part 12 of the hood 7 into the open position thereof in order to obtain access to the parts of the engine in question. In case of major repairs, the lower part 10 of the hood 7 may also be readily removed.

A transmission of the noises emanating from the engine, especially from the valve control thereof, into the vehicle interior space is avoided by the use of an arrangement and construction in accordance with the present invention.

Of course, it is also possible to construct the hood 7 in one part without subdivision thereof and to secure the same by rapid connecting means of any suitable construction to the vehicle frame 4 so as to be readily detachable therefrom. If spatial conditions within the engine compartment permit, the hood 7 in accordance with the present invention may also be suspended from the outer hood 6 and laterally supported in any suitable manner by means of connecting members made of sound-damping material so that, during opening pivoting movement of the hood 6 into the open position thereof, the hood 7 is lifted simultaneously therewith. Of course, the same suspension is also applicable to the upper part 12 in case of a subdivided hood 7 which, in that case, may be suspended by means of sound-absorbing connecting members with the outer sheet-metal hood 6 to move in unison therewith during pivot movements of the latter, while the lower part 10 is detachably connected with the vehicle frame 4.

In the embodiment according to FIGURES 4 and 5, the hood in accordance with the present invention designated by reference numeral 7' consists exclusively of a cover provided with a front part 7" which screens only the upper part and front end of the engine 5', and is laterally secured at the engine 5' by means of elastic connecting members 15. The cover 7' is provided at the front end thereof with a deflecting body portion 7'" disposed about the drive shaft for the fan 11 which aids in effecting a lateral flow or discharge of the cooling air supplied through the radiator by the fan 11 past the engine 5'.

For purposes of providing a very intensive cooling, the front end of the cover 7' may be provided additionally with air inlet apertures of any suitable size, number and arrangement.

The term "vehicle superstructure" is used herein to designate those parts of the vehicle normally constituted by the frame and body and/or those parts of the vehicle constituted by a self-supporting type body construction.

While I have shown two embodiments in accordance with the present invention, it is understood that the same is not limited thereto but is susceptible of many changes and modifications within the spirit and scope of the present invention. For example, the hood 7 or 7' in accordance with the present invention may be varied to suit the particular design of the engine compartment and/or engine construction. Additionally, the hood walls 7 or 7' may be made of any suitable sound-absorbing material reinforced in any suitable manner to impart thereto the required rigidity.

Any suitable known connecting means preferably of sound-absorbing material may be provided for the various connections mentioned hereinabove.

Thus, it is obvious that the present invention is susceptible of many changes and modifications within the spirit and scope thereof, and I, therefore, do not wish to be limited to the details shown and described herein, but intend to cover all such changes and modifications as are encompassed by the scope of the appended claims.

I claim:

1. In a conventional automotive vehicle having a frame, an engine compartment, and an engine therein, an acoustic cover for said engine, said cover being of inverted dish-shape and having an outwardly extending flange around the edge thereof, said cover having a radiator-encircling opening at one end and suitable fastening means extending through said flange and anchored to said frame.

2. A vehicle according to claim 1 in which the cover has a hinged top.

3. A vehicle according to claim 1 in which the cover is made of metal-reinforced resilient material.

References Cited in the file of this patent

UNITED STATES PATENTS

| | | |
|---|---|---|
| 1,922,200 | Frank | Aug. 15, 1933 |
| 2,011,988 | Timian | Aug. 20, 1935 |
| 2,123,358 | Grutzner | July 12, 1938 |
| 2,177,687 | Bracken et al. | Oct. 31, 1939 |
| 2,252,285 | Eglinton et al. | Aug. 12, 1941 |
| 2,323,936 | Roberts | July 13, 1943 |
| 2,355,208 | Devol et al. | Aug. 8, 1944 |
| 2,701,024 | Thomas | Feb. 1, 1955 |
| 2,763,586 | Noyes | Sept. 18, 1956 |
| 2,808,122 | Meyers | Oct. 1, 1957 |
| 2,886,721 | Picozzi et al. | May 12, 1959 |

FOREIGN PATENTS

| | | |
|---|---|---|
| 567,567 | Great Britain | Feb. 20, 1945 |
| 448,081 | Canada | Apr. 27, 1948 |
| 640,740 | Great Britain | July 26, 1950 |